United States Patent
Patocka

(10) Patent No.: US 10,402,101 B2
(45) Date of Patent: Sep. 3, 2019

(54) SYSTEM AND METHOD FOR USING PERSISTENT MEMORY TO ACCELERATE WRITE PERFORMANCE

(71) Applicant: Red Hat, Inc., Raleigh, NC (US)

(72) Inventor: Mikulas Patocka, Brno (CZ)

(73) Assignee: RED HAT, INC., Raleigh, NC (US)

( * ) Notice: Subject to any disclaimer, the term of this patent is extended or adjusted under 35 U.S.C. 154(b) by 43 days.

(21) Appl. No.: 14/990,269

(22) Filed: Jan. 7, 2016

(65) Prior Publication Data

US 2017/0199679 A1    Jul. 13, 2017

(51) Int. Cl.
| | |
|---|---|
| G06F 12/00 | (2006.01) |
| G06F 3/06 | (2006.01) |
| G06F 12/0804 | (2016.01) |
| G06F 12/0877 | (2016.01) |
| G06F 12/0893 | (2016.01) |

(52) U.S. Cl.
CPC ............ *G06F 3/0613* (2013.01); *G06F 3/064* (2013.01); *G06F 3/0659* (2013.01); *G06F 3/0685* (2013.01); *G06F 12/0804* (2013.01); *G06F 12/0877* (2013.01); *G06F 12/0893* (2013.01); *G06F 2212/1024* (2013.01); *G06F 2212/301* (2013.01); *G06F 2212/60* (2013.01)

(58) Field of Classification Search
CPC ............ G06F 12/0804; G06F 12/0246; G06F 2212/222; G06F 3/0613; G06F 12/0877; G06F 12/023; G06F 12/0893; G06F 3/0659; G06F 3/0685
See application file for complete search history.

(56) References Cited

U.S. PATENT DOCUMENTS

| | | | |
|---|---|---|---|
| 5,535,369 A * | 7/1996 | Wells | G06F 3/0601 711/103 |
| 8,041,904 B2 | 10/2011 | Ergan et al. | |
| 8,719,501 B2 | 5/2014 | Flynn et al. | |
| 8,756,375 B2 | 6/2014 | Flynn | |
| 2006/0041731 A1 | 2/2006 | Jochemsen et al. | |
| 2007/0033356 A1 | 2/2007 | Erlikhman | |
| 2011/0022801 A1* | 1/2011 | Flynn | G06F 9/52 711/120 |
| 2011/0191522 A1 | 8/2011 | Condict et al. | |
| 2011/0320733 A1 | 12/2011 | Sanford et al. | |
| 2013/0086330 A1* | 4/2013 | Baddepudi | G06F 12/0868 711/143 |

(Continued)

OTHER PUBLICATIONS

"Microsoft Computer Dictionary", 2002, Microsoft Press, 5th Edition, pp. 220, 399, 463.*

(Continued)

*Primary Examiner* — Arvind Talukdar
(74) *Attorney, Agent, or Firm* — K&L Gates LLP

(57) ABSTRACT

A central processing unit (CPU) executes a write request for first data to be written to a first block of a storage device. Executing the write request includes determining whether the first block is remapped to a first memory block in the persistent memory and whether the first memory block is in an uncommitted state. Responsive to determining that the first block is remapped to the first memory block in the persistent memory and that the the first memory block is in an uncommitted state, the CPU overwrites the first memory block in the persistent memory with the first data.

20 Claims, 6 Drawing Sheets

(56) References Cited

U.S. PATENT DOCUMENTS

| | | | | |
|---|---|---|---|---|
| 2013/0191582 | A1* | 7/2013 | Shiwalkar | G06F 12/0246 711/103 |
| 2013/0326150 | A1* | 12/2013 | Phelan | G06F 12/0895 711/135 |
| 2014/0115235 | A1* | 4/2014 | Ito | G06F 12/0868 711/103 |
| 2016/0092464 | A1* | 3/2016 | Hildebrand | G06F 17/30185 707/648 |
| 2016/0239431 | A1* | 8/2016 | Li | G06F 12/1045 |
| 2016/0246724 | A1* | 8/2016 | Boehm | G06F 11/30 |

OTHER PUBLICATIONS

Stokes, "Understanding CPU Caching and Performance", 2002, Ars Technica, retrieved at: https://arstechnica.com/gadgets/2002/07/caching/ (Year: 2002).*

"Micron Introduces Persistent Memory Solution That Combines DRAM Performance with NAND Flash Reliability to Address Big Data Challenges", 2015, Micron (Year: 2015).*

Singh, CS 542 Database Managment Systems Failure Recovery, Concurrency Control, 2011, WPI, retrieved at: https://www.slideshare.net/j_singh/cs-542-failure-recovery-concurrency-control (Year: 2011).*

Rouse, "cache memory", 2015, TechTarget, retrieved at: https://searchstorage.techtarget.com/definition/cache-memory (Year: 2015 ).*

Smullen, "Accelerating Enterprise Solid-State Disks with Non-Volatile Merge Caching", 2010, IEEE, retrieved at: https://ieeexplore.ieee.org/stamp/stamp.jsp?tp=&arnumber=5598310 (Year: 2010).*

Mesnier et al. "A Protected Block Device for Persistent Memory", 2014, slides, retrieved at: http://storageconference.us/2014/Presentations/Mesnier.pdf (Year: 2014).*

Bitar, "Oracle Database Performance Results with Smart Flash Cache on Sun SPARC Enterprise Midrange Server", 2011, Oracle, retrieved at: https://www.oracle.com/technetwork/articles/servers-storage-admin/smart-flash-cache-oracle-perf-361527.html (Year: 2011).*

Glen, "Optimized Client Computing with Dynamic Write Acceleration," 2014, Micron, retrieved at: https://www.micron.com/resource-details/253a74f6-b4b8-457b-940a-27b5415b95d9 (Year: 2014).*

"Accelerating Applications Using Flash and Non-Volatile Memory", Aug. 18, 2015, excerpt from http://www.slideshare.net/sandisk/accelerating-applications-using-flash-and-nonvolatile-memory (18 pages).

"Transforming Application Performance with Persistent Memory", 2013, excerpt from hhttps://www.ids-g.com/media/1030/violin-whitepaper-application-performance.pdf (10 pages).

* cited by examiner

SYSTEM AND METHOD FOR USING PERSISTENT MEMORY TO ACCELERATE WRITE PERFORMANCE

BACKGROUND

Storage devices are typically used to provide additional storage capacity to users of a computer system. Storage devices can be volatile or non-volatile or may include both volatile and non-volatile memory. Volatile memory does not store data when powered off, while non-volatile memory continues to store data after it is powered off. Generally, volatile memory provides quicker access than non-volatile memory, while non-volatile memory offers protection against power failures.

Accessing storage devices may involve multiple read and/or write operations over a short period of time. However, accessing storage devices in this manner tends to be relatively slow in comparison to central processing unit (CPU) processing speeds. Thus, the input/output (I/O) operations traditionally associated with storage devices may create or contribute to performance bottlenecks. Improved methods and systems for accelerating write performance while protecting data from system failures are desirable.

SUMMARY

The present disclosure provides a new and innovative system, methods and apparatus for using persistent memory to accelerate write performance. In an example embodiment, the system includes a CPU, a CPU cache and a persistent memory. The CPU is configured to execute a write request, where the write request requests first data to be written to a first block of a storage device. Executing the write request includes determining whether the first block is remapped to a first memory block in the persistent memory and whether the first memory block is in an uncommitted state. Responsive to determining that the first block is remapped to the first memory block in the persistent memory and that the first memory block is in an uncommitted state, the CPU is configured to overwrite the first memory block in the persistent memory with the first data.

Additional features and advantages of the disclosed method and apparatus are described in, and will be apparent from, the following Detailed Description and the Figures.

DETAILED DESCRIPTION OF EXAMPLE EMBODIMENTS

Figure 1:
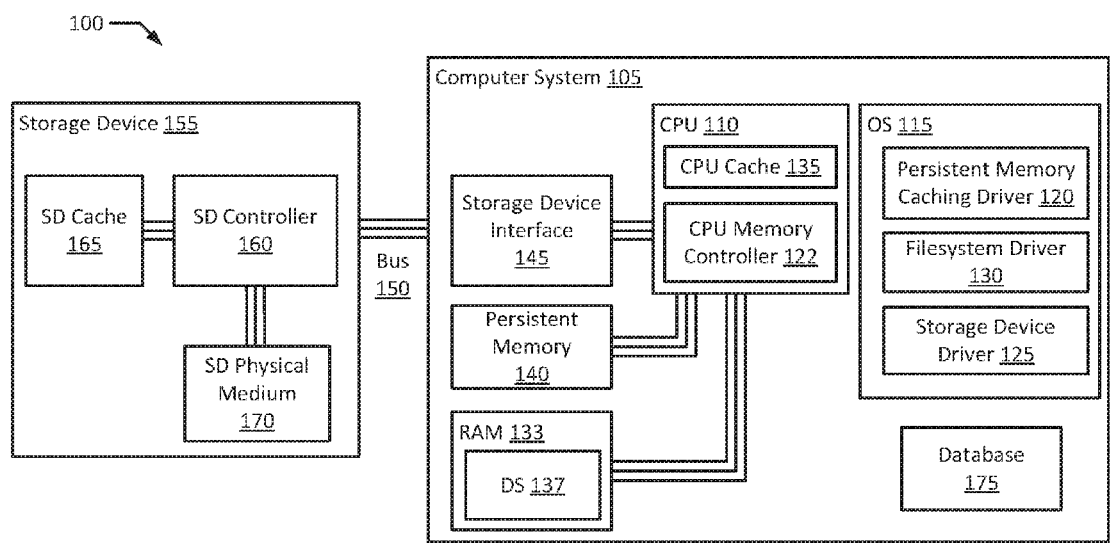
FIG. 1 is a block diagram of an example system for using persistent memory to accelerate write performance according to an example embodiment of the present disclosure.

FIG. 1 depicts a block diagram of an example system for using persistent memory to accelerate write performance according to an example embodiment of the present disclosure. The system 100 may include a computer system 105 and one or more storage devices 155.

Performing memory access operations (e.g., input/output (I/O) operations and other forms of memory access) on storage devices 155 tend to be relatively slow. The persistent memory caching driver 120 of the present disclosure can be used in conjunction with CPU caches 135 and persistent memory 140 to accelerate memory access operations as well as ensure that written data persists in case of power failure. Data intended for a storage device 155 may be written first to persistent memory 140. Then, data that is stored in the persistent memory 140 and that is mapped from the storage device 155 to persistent memory 140 may asynchronously be written back to the storage device 155. The persistent memory caching driver 120 may perform writeback operations when it detects that the quantity of memory available in persistent memory decreases below a certain threshold. Additional features and advantages of the disclosed method, system, and apparatus are described below.

In an example embodiment, the computer system 105 may include a computing device, a server, etc. In another example embodiment, the computer system 105 may include a virtual machine or program executing on a personal computing device, server, one or more physical processors, etc. In an example embodiment, a user or client makes requests and otherwise communicates with the computer system 105. In an example embodiment a user or client makes requests and otherwise communicates with the storage device 155 via the computer system 105.

In an example embodiment, the storage device 155 may include a hard disk device (e.g., a magnetic or rotational disk), a flash device, or a solid state device. In an example embodiment, a storage device 155 may include multiple forms of memory. For example, a storage device 155 may include both volatile and non-volatile memory. In an example embodiment, a storage device 155 may include an array composed of multiple hard disks and/or solid state devices. In an example embodiment, the storage device 155 may be composed of multiple sectors. For example, each sector may be 512 bytes or 4096 bytes.

The storage device 155 may include a storage device controller 160, a storage device cache 165, and a storage device physical medium 170. In an example embodiment, the storage device controller 160 manages data and storage for the storage device 155 including I/O operations and other memory accesses by communicating with the storage device cache 165 and/or the storage device physical medium 170. In an example embodiment, the storage device controller 160 is communicatively coupled to the storage device cache 165 and the storage device physical medium 170. In an example embodiment, the storage device cache 165 may be volatile memory of the storage device 155. In an example embodiment, the storage device physical medium 170 may be non-volatile memory of the storage device 155.

In an example embodiment, the storage device 155 receives requests from the computer system 105 and sends responses to the computer system 105. For example, the storage device 155 receives memory access requests from the computer system 105 and sends responses to the computer system 105 via the storage device controller 160. As used herein, the term request and command may be used interchangeably. Examples of memory access requests from the computer system 105 may include read requests, write requests, flush cache requests, and discard requests. In an example embodiment, read requests, write requests, flush cache requests, and discard requests are executed by the storage device controller 160. In an example embodiment, read requests, write requests, and discard requests may include an identification of the location of the requested data to be read, written, or discarded (depending on the request) in the memory of the storage device 155 (e.g., an identification of a location in the storage device cache 165 or in the storage device physical medium 170). For example, read requests, write requests, and discard requests may each include an identification of a starting sector and a number of sectors in the memory of the storage device 155 to be read, written, or discarded (depending on the request).

In an example embodiment, when executed, a read request causes a specified location or range in the memory of the storage device 155 to be read and returned to the computer system 105. The data that is read and returned may then be stored in the RAM 133. In an example embodiment, when executed, a write request causes data to be read from a memory location on the computer system 105 and written to the storage device 155 at a specified location or range in the memory of the storage device 155. In an example embodiment, when executed, a write request causes data to be written directly to the storage device physical medium 170 (using the storage device controller 160). In an example embodiment, when executed, a write request causes data to be written to the storage device cache 165 using the storage device controller 160. The data written to the storage device cache 165 may then later be flushed to the storage device physical medium 170. In an example embodiment, the storage device 155 flushes data from the storage device cache 165 to the storage device physical medium 170 on its own. In another example embodiment, the storage device 155 flushes data from the storage device cache 165 to the storage device physical medium 170 in response to a flush cache request from the computer system 105. In an example embodiment, when executed, a discard request causes data stored in a specified location to be discarded (e.g., deleted or forgotten). In an example embodiment, when executed, a flush cache request causes the storage device cache 165 to be flushed such that data is written to the storage device physical medium 170. In an example embodiment, if a power failure of the storage device 155 occurs before data is flushed from the storage device cache 165 to the storage device physical medium 170, the data will be lost. If, for example, the data is flushed from the storage device cache 165 before a power failure occurs, this data will be preserved in the storage device physical medium 170.

In an example embodiment the computer system 105 may include a CPU 110, a random-access memory (RAM) 133, persistent memory 140, and a storage device interface 145. In an example embodiment the CPU 110 may be communicatively coupled to the RAM 133, the persistent memory 140, and the storage device interface 145. In an example embodiment, the CPU 110 includes a CPU cache 135. In an example embodiment, the RAM 133 includes a data structure (DS) 137. As used herein, the CPU (otherwise referred to as a processor) 110 refers to a device capable of executing instructions encoding arithmetic, logical, and/or I/O operations. In one illustrative example, a processor may follow Von Neumann architectural model and may include an arithmetic logic unit (ALU), a control unit, a plurality of registers, a CPU cache 135, and a memory controller 122. In a further aspect, a processor may be a single core processor or a multi-core processor. In another aspect, a processor may be implemented as a single integrated circuit, two or more integrated circuits, or may be a component of a multi-chip module (e.g., in which individual microprocessor dies are included in a single integrated circuit package and hence share a single socket).

In an example embodiment, the software running on the computer system 105 includes an operating system (OS) 115. The OS 115 may include one or more drivers including a persistent memory caching driver 120, a storage device driver 125, and a filesystem driver 130. As used herein, a driver may otherwise be referred to as a software component, a controller, a program, an application, a function, a procedure, a subroutine, code, or the like. The code and data associated with the OS 115, persistent memory caching driver 120, storage device driver 125, and filesystem driver 130 may reside in memory and be executed using the CPU 110. In an example embodiment, the persistent memory caching driver 120 facilitates memory access operations on the persistent memory 140. In an example embodiment, the storage device driver 125 facilitates memory access operations on the storage device 155. In an example embodiment, the filesystem driver 130 may transmit access requests to and receive responses from the persistent memory caching driver 120 or the storage device driver 125. In an example embodiment, the computer system 105 may include a database 175. In an example embodiment, the database 175 may transmit access requests to and receive responses from the persistent memory caching driver 120 or the storage device driver 125. In an example embodiment, the database 175 may run as a process on the OS 115 and communicate with the OS 115 via system call interface.

In an example embodiment, the storage device interface 145 is an interface between the computer system 105 and the storage device 155. For example, the storage device interface 145 may include a host adapter and/or a chipset. In an example embodiment, the computer system 105 may be communicatively coupled to the storage device 155 via a bus 150. In an example embodiment, the bus 150 may be one of an integrated drive electronics (IDE), small computer system interface (SCSI), serial advanced technology attachment (SATA), serial attached SCSI (SAS), Fibre Channel, or PCI Express bus. In an example embodiment, if the bus 150 is a PCI Express bus, the storage device interface 145 does not include a host adapter.

In an example embodiment, persistent memory 140 is directly connected to the CPU 110 and is accessed directly with CPU instructions. In an example embodiment, persistent memory 140 typically features performance and density similar to dynamic RAM (DRAM) but has the additional advantage that it does not lose data upon power failure. In an example embodiment, memory access operations on persistent memory 140 are typically faster than similar operations on a storage device 155 such as a hard disk or an SSD because persistent memory 140 is able to be accessed directly with CPU instructions.

In an example embodiment, persistent memory 140 is inserted into memory slots on the motherboard of a computer or server. Persistent memory 140 may be mapped to CPU 110 address space like other forms of memory. For example, a CPU 110 can perform memory access operations on persistent memory 140 in the same way it would with other forms of memory. In an example embodiment, data in the persistent memory 140 may be cached in the CPU cache 135. In an example embodiment, data may be cached in the CPU cache 135 before being stored in persistent memory 140.

Figure 2:
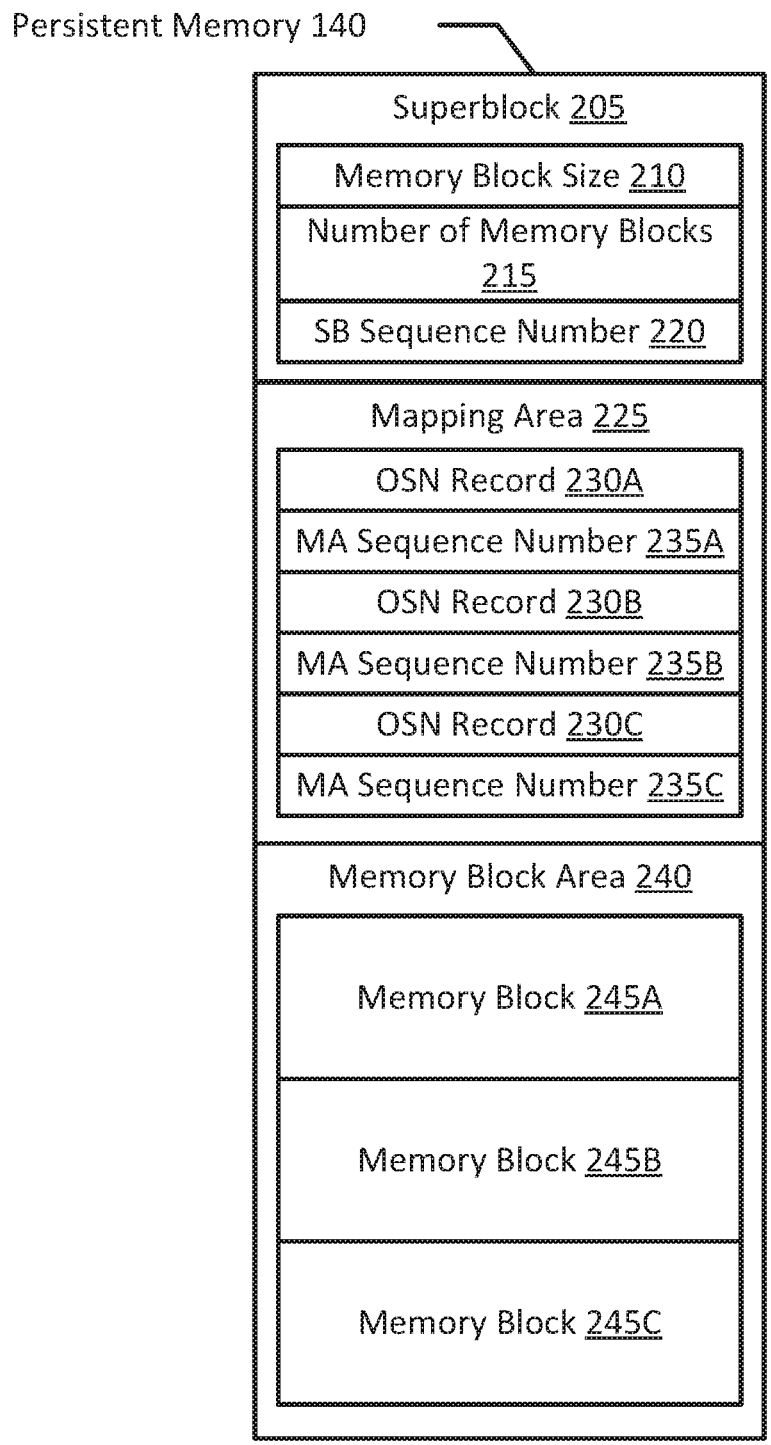
FIG. 2 is a block diagram illustrating an example of persistent memory according to an example embodiment of the present disclosure.

FIG. 2 depicts a block diagram of an example persistent memory 140 according to an example embodiment of the present disclosure. In an example embodiment, the persistent memory 140 may include a metadata area including a superblock 205 and a mapping area 225 for storing metadata regarding the data stored in the memory block area 240. In an example embodiment, the metadata included in the superblock 205 and the mapping area 225 may be part of a single area or may be further subdivided into additional areas. The persistent memory 140 may further include a memory block area 240 for storing data. In an example embodiment, the superblock 205 stores general metadata information such as a memory block size 210 (e.g., 512 bytes or 4096 bytes) that describes the size of the memory blocks 245A-C in the memory block area 240, a number of memory blocks 215 that describes the number of memory blocks 245A-C in the memory block area 240, and a superblock sequence number 220.

In an example embodiment the mapping area 225 stores metadata information corresponding to each memory block 245A including original sector number (OSN) records 230A-C and mapping area sequence numbers 235A-C. For example, OSN record 230A and mapping area sequence numbers 235A may include metadata corresponding to memory block 245A, OSN record 230B and mapping area sequence numbers 235B may include metadata corresponding to memory block 245B, and OSN record 230C and mapping area sequence numbers 235C may include metadata corresponding to memory block 245C. In an example, embodiment, the original sector number refers to the location of a block of the storage device 155.

In an example embodiment, the persistent memory 140 further includes a memory block area 240 in which data is stored in memory blocks 245A-C. In an example embodiment, the memory block area 240 includes the number of memory blocks 245A-C specified by the number of memory blocks 215 metadata area and includes memory blocks 245A-C of the size specified in the memory block size 210 metadata area. In an example embodiment, a sector or memory block 245A-C may be of a variety of different sizes.

In an example embodiment, an OSN record 230B may include the location of a block in the storage device 155 to which the corresponding memory block 245B is mapped. In an example embodiment, if the OSN record 230B does not include such a location of a block in the storage device 155, then the corresponding memory block 245B has not been mapped to the storage device 155.

In an example embodiment, the CPU 110 generates a data structure 137 (e.g., a tree or a hash table) that can be used to accelerate the execution of operations corresponding to the persistent memory 140. In an example embodiment, the data structure 137 may be stored in volatile memory, such as the RAM 133. In an example embodiment, the data structure 137 may be stored in non-volatile memory, such as the persistent memory 140.

In an example embodiment, the data structure 137 may use tree or hash table algorithms to find a memory block 245A-C relatively quickly. In an example embodiment, the data structure 137 may include a list of blocks in a FREE state to facilitate relatively quick searches for FREE blocks. In an example embodiment, the data structure 137 may store similar lists for blocks in each of an UNCOMMITTED state, a COMMITTED state, and a WRITEBACK state.

In an example embodiment, each memory block 245A-C is in one of four states: FREE, UNCOMMITTED, COMMITTED, or WRITEBACK. In an example embodiment, during normal operation, the state of each memory block changes in the following sequence: from FREE to UNCOMMITTED, from UNCOMMITTED to COMMITTED, from COMMITTED to WRITEBACK, and from WRITEBACK to FREE. In an example embodiment, when a memory block 245A-C is in a FREE state, it holds no useful data. In an example embodiment, when a memory block 245A-C is in an UNCOMMITTED state, it holds data that was written to the memory block 245A-C but has not been committed to the memory block 245A-C with a flush cache request. For example, if a power failure occurs, the data stored in an UNCOMMITTED memory block 245A-C will typically be lost or corrupted. In an example embodiment, when a memory block 245A-C is in a COMMITTED state, it holds data that was written to the memory block 245A-C and has been committed to the memory block 245A-C with a flush cache request. In an example embodiment, when a memory block 245A-C is in a WRITEBACK state, the content of the memory block 245A-C is being copied from the persistent memory 140 to the storage device 155. Once this copying is complete, the state of the memory block 245A-C is changed to FREE.

In an example embodiment, if a mapping area sequence number 235A is less than the superblock sequence number 220, the corresponding memory block 245A is in a COMMITTED state. In an example embodiment, if a mapping area sequence number 235A is equal to the superblock sequence number 220, the corresponding memory block 245A is in an UNCOMMITTED state.

In an example embodiment, if the persistent memory 140 is formatted, all the memory blocks 245A-C of the persistent memory 140 are set to a FREE state. In an example embodiment, when the persistent memory caching driver 120 is initially loaded, it reads the contents of the persistent memory 140 (in particular the superblock 205 and the mapping area 225) and builds a data structure 137. In an example embodiment, when the persistent memory caching driver 120 is initially loaded, memory blocks 245A-C that are in an UNCOMMITTED state are changed to a FREE state.

Figure 3:
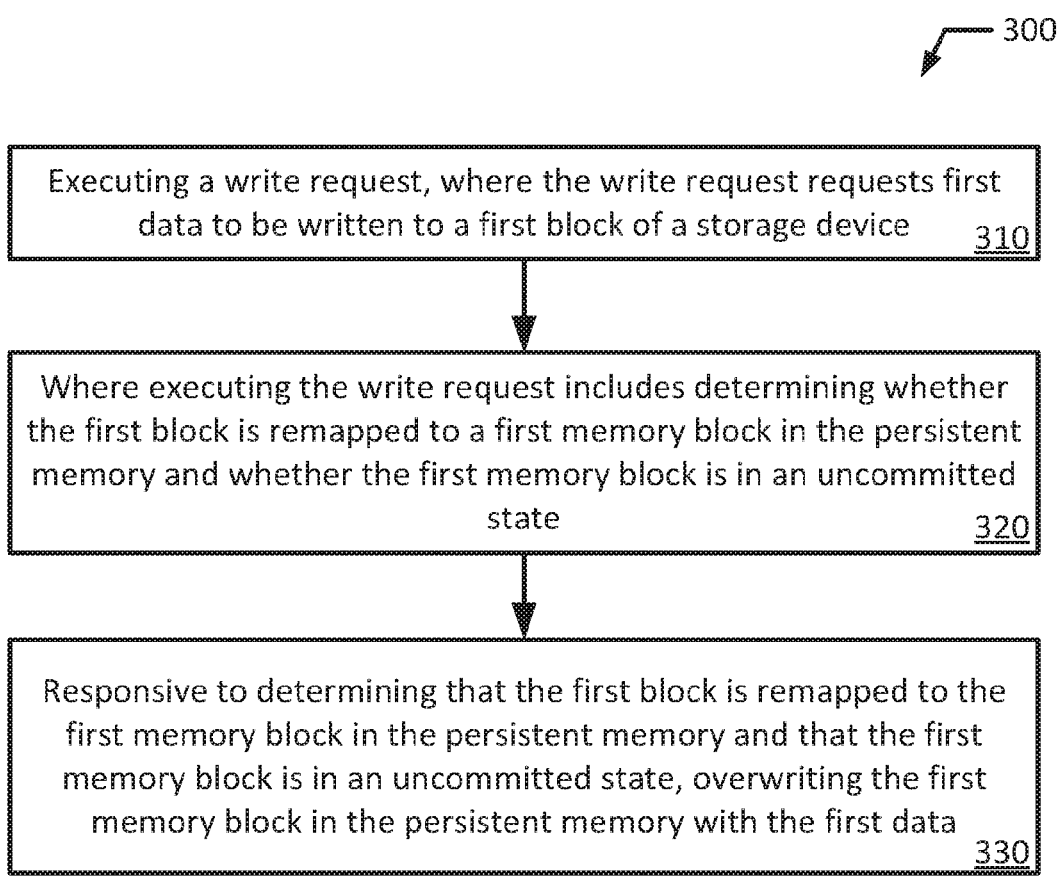
FIG. 3 is a flowchart illustrating an example process for using persistent memory to accelerate write performance according to an example embodiment of the present disclosure.

FIG. 3 illustrates a flowchart of an example method 300 for using persistent memory to accelerate write performance in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example embodiment, the method is performed by CPU 110 and/or persistent memory caching driver 120.

In the illustrated example embodiment, the CPU 110 executes a write request, where the write request requests first data to be written to a first block of a storage device (block 310). In an example embodiment, the write request is executed by the persistent memory caching driver 120. In an example embodiment, the persistent memory caching driver 120 receives the write request from an application or device internal to the OS 115 such as the filesystem driver 130. In an example embodiment, the persistent memory caching driver 120 receives the write request from an application or device external to the OS 115 such as database 175.

In an example embodiment, executing the write request includes determining whether the first block is remapped to a first memory block 245A in the persistent memory 140 and whether the first memory block 245A is in an UNCOMMITTED state (block 320). In an example embodiment, the write request may include an original sector number that corresponds to the first block of the storage device 155. In an example embodiment, determining whether the first memory block 245A is remapped in the persistent memory 140 includes determining whether the corresponding OSN record 230A includes a record with an original sector number that matches the original sector number included in the write request. In an example embodiment, if the value in the OSN record 230A matches the original sector number included in the write request, then the CPU 110 (and/or persistent memory caching driver 120) determines that the first memory block 245A is remapped in the persistent memory 140. In an example embodiment, if the value in the OSN record 230A does not match the original sector number included in the write request, then the CPU 110 determines that the first memory block 245A is not remapped in the persistent memory.

In an example embodiment, determining whether the first memory block 245A is in an UNCOMMITTED state includes determining whether the corresponding mapping area sequence number 235A is equal to the superblock sequence number 220. In an example embodiment, if the mapping area sequence number 235A is equal to the superblock sequence number 220, then the first memory block 245A is in an UNCOMMITTED state. For example, if the mapping area sequence number 235A is not equal to the superblock sequence number 220, then the first memory block 245A is not in an UNCOMMITTED state. In an example embodiment, the CPU 110 and/or persistent memory caching driver 120 may determine whether the first memory block 245A is in an UNCOMMITTED state by searching a list of blocks in an UNCOMMITTED state stored in the data structure 137.

In an example embodiment, if the CPU 110 (and/or persistent memory caching driver 120) determines that the first block is remapped to the first memory block 245A in the persistent memory 140 and that the first memory block 245A is in an UNCOMMITTED state, the CPU 110 (and/or persistent memory caching driver 120) overwrites the first memory block 245A in the persistent memory 140 with the first data (block 330). For example, a database 175 may request that the computer system 105 write data to the storage device 155 and then perform a number of operations on the written data. In an example embodiment, rather than immediately perform the relatively slow operation of writing the database 175 data to the first block of the storage device 155, the computer system 105 may write the database 175 data to the first memory block 245A of the persistent memory 140 in the manner described by example method 300. By writing to the persistent memory 140 rather than immediately to the storage device 155, the persistent memory caching driver 120 of the present disclosure advantageously improves the speed of the memory access operation and overall system performance.

Figure 4A:
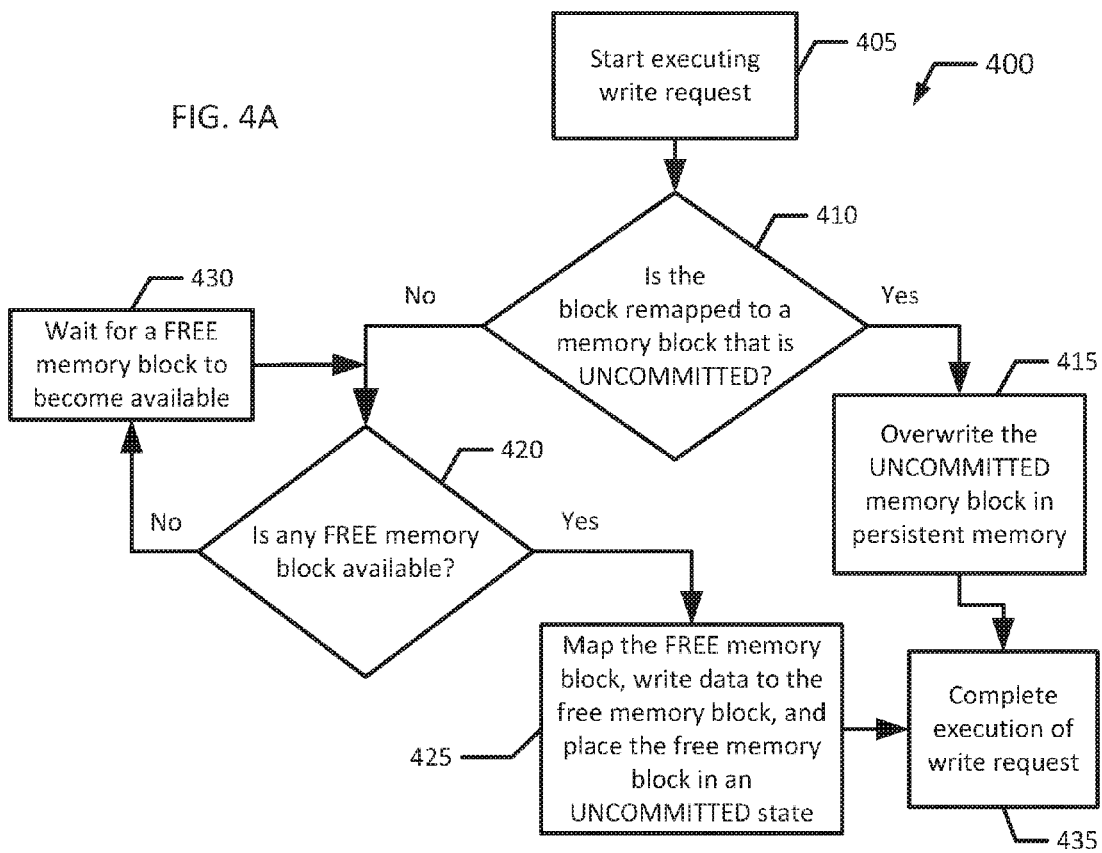
FIG. 4A is a flowchart illustrating an example process for executing a write request according to an example embodiment of the present disclosure.

FIG. 4A illustrates a flowchart of an example method 400 for executing a write request according to an example embodiment of the present disclosure. Although the example method 400 is described with reference to the flowchart illustrated in FIG. 4A, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method is performed by CPU 110 and/or persistent memory caching driver 120.

Example method 400 starts and the CPU 110 (and/or persistent memory caching driver 120) starts executing a write request (block 405). In an example embodiment, as described with respect to FIG. 3, the write request may request first data to be written to a first block of a storage device 155. The CPU 110 (and/or persistent memory caching driver 120) may then determine whether the first block of the storage device 155 has been remapped to a first memory block 245A in the persistent memory 140 and whether the first memory block 245A is in an UNCOMMITTED state (block 410). Example embodiments of this determining step are described in greater detail above and with respect to block 320 of FIG. 3. In an example embodiment, if it is determined that the first block of the storage device 155 has been remapped to the memory block 245A in the persistent memory 140 and that the memory block 245A is in an UNCOMMITTED state, the CPU 110 (and/or persistent memory caching driver 120) overwrites the memory block 245A in the persistent memory 140 with the data included in the write request (block 415). Example embodiments of this overwriting step are described in greater detail above and with respect to block 330 of FIG. 3. In an example embodiment, the CPU 110 (and/or persistent memory caching driver 120) may then complete execution of the write request (block 435).

In an example embodiment, if the CPU 110 (and/or persistent memory caching driver 120) determines either that the first block of the storage device 155 is not remapped in the persistent memory 140 or that the memory block 245A is not in an UNCOMMITTED state, it determines whether the persistent memory 140 includes another memory block 245B that is in a FREE state (block 420). In an example embodiment, the CPU 110 (and/or persistent memory caching driver 120) may perform this determination by searching a list of FREE memory blocks in the data structure 137 to determine if a FREE memory block is present in the persistent memory 140. In an example embodiment, if the CPU 110 (and/or persistent memory caching driver 120) determines that no FREE memory block is available, the CPU 110 (and/or persistent memory caching driver 120) may wait until a FREE memory block becomes available (block 430). In an example embodiment, the CPU 110 (and/or persistent memory caching driver 120) may wait a predetermined period of time. In an example embodiment, the CPU 110 (and/or persistent memory caching driver 120) may execute a writeback operation as described below and with respect to FIG. 5 instead of or while waiting for a FREE memory block to become available. In an example embodiment, the CPU 110 (and/or persistent memory caching driver 120) may execute a writeback operation after waiting a predetermined period of time and determining again that no FREE memory block is available.

In an example embodiment, if the CPU 110 (and/or persistent memory caching driver 120) determines that a memory block 245B in a FREE state is available, the CPU 110 (and/or persistent memory caching driver 120) maps the FREE memory block 245B to the first block of the storage device 155 identified in the write request, writes the data included in the write request to the FREE memory block 245B, and places the FREE memory block 245B in an UNCOMMITTED state (block 425). In an example embodiment, mapping the FREE memory block 245B includes mapping the FREE memory block 245B to persistent memory 140 by setting the value of the OSN record 230B corresponding to the FREE memory block 245B to an original sector number of the first block of the storage device 155. In an example embodiment, the write request may specify the original sector number of the first block of the storage device 155 to be written to.

In an example embodiment, the CPU 110 (and/or persistent memory caching driver 120) places the FREE memory block 245B in an UNCOMMITTED state by setting the value of the mapping area sequence number 235B corresponding to the FREE memory block 245B equal to the value of the superblock sequence number 220. In an example embodiment when the state of the memory block 245B is changed from FREE to UNCOMMITTED, the CPU 110 (and/or persistent memory caching driver 120) removes the memory block 245B from the list of FREE blocks in the data structure 137.

In an example embodiment, the CPU 110 (and/or persistent memory caching driver 120) may then complete execution of the write request (block 435). In an example embodiment, upon completion of the write request, an indication that the write request completed successfully may be returned to the source of the request (e.g., the filesystem driver 130 or the database 175). Accordingly, by caching write requests for the storage device 155 in the persistent memory 140 in this manner, the method of the present disclosure facilitates faster completion of write requests than if the write request were directed straight to the storage device 155.

In an example embodiment, the CPU 110 (and/or persistent memory caching driver 120) may execute a flush cache request where the flush cache request requests that the CPU cache 135 be flushed for one or more UNCOMMITTED memory blocks 245A-C. In an example embodiment, the flush cache request requests that the CPU cache 135 be flushed for all UNCOMMITTED memory blocks 245A-C. In an example embodiment, executing a flush cache request includes flushing cached data in a CPU memory controller 122 to the persistent memory 140 and changing the state of the one or more memory blocks 245A-C in an UNCOMMITTED state to a COMMITTED state. In an example embodiment, the CPU 110 (and/or persistent memory caching driver 120) executes a flush cache operation after the completion of each write request. In an example embodiment, executing a flush cache request includes flushing cached data in the CPU cache 135, flushing cached data in a CPU memory controller 122 to the persistent memory 140, and changing the state of the one or more memory blocks 245A-C in an UNCOMMITTED state to a COMMITTED state. In an example embodiment, flushing cached data in the CPU cache 135 may be executed using the CLWB instruction. In an example embodiment, flushing cached data in a CPU memory controller 122 to the persistent memory 140 may be executed using the PCOMMIT instruction. In an example embodiment, changing the state of the one or more memory blocks 245A-C in an UNCOMMITTED state to a COMMITTED state includes incrementing the value of the superblock sequence number 220. For example, incrementing the value of the superblock sequence number 220 changes the state of all memory blocks 245A-C in an UNCOMMITTED state to a COMMITTED state.

In an example embodiment, executing a flush cache request includes flushing the CPU cache 135, executing a PCOMMIT instruction that flushes cached data in the CPU memory controller 122, incrementing the value of the superblock sequence number 220, flushing a cache line that holds data of the superblock 205, and executing the PCOMMIT instruction again. In an example embodiment, when the persistent memory caching driver 120 is unloaded, it executes a flush cache request for all the UNCOMMITTED memory blocks 245A-C.

In an example embodiment, execution of the write request and flush cache request by the CPU 110 (and/or persistent memory caching driver 120) of the present disclosure advantageously does not require any communication with the storage device 155.

In an example embodiment, the CPU 110 (and/or persistent memory caching driver 120) may process a discard request by changing the state of a specified memory block 245A-C to FREE and sending the discard request to the storage device driver 125. The storage device driver 125 may then cause the data in the block of the storage device 155 to be discarded or forward the discard request to the storage device 155. In an example embodiment, the discard request may specify an original sector number. In an example embodiment, changing the state of the specified memory block 245A-C to FREE further includes adding the specified memory block 245A-C to a list of FREE memory blocks 245A-C of the data structure 137.

Figure 4B:
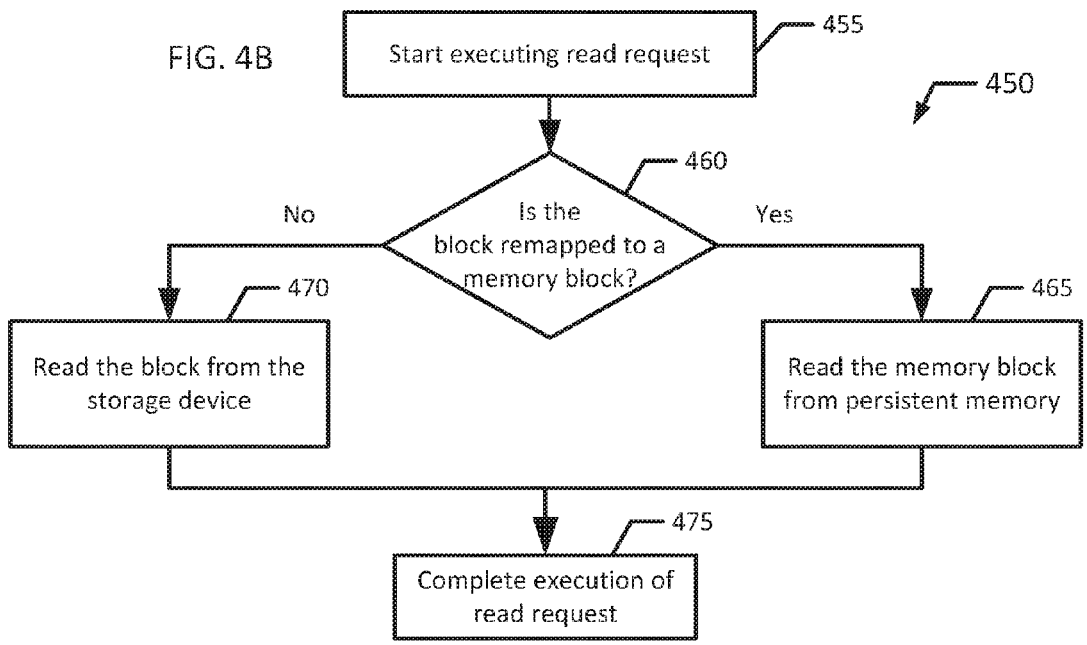
FIG. 4B is a flowchart illustrating an example process for executing a read request according to an example embodiment of the present disclosure.

FIG. 4B illustrates a flowchart of an example method 450 for executing a read request according to an example embodiment of the present disclosure. Although the example method 450 is described with reference to the flowchart illustrated in FIG. 4B, it will be appreciated that many other methods of performing the acts associated with the method 450 may be used. For example, the order of some of the blocks may be changed, certain blocks may be combined with other blocks, and some of the blocks described are optional. The method 450 may be performed by processing logic that may comprise hardware (circuitry, dedicated logic, etc.), software, or a combination of both. In an example embodiment, the method is performed by CPU 110 and/or persistent memory caching driver 120.

Example method 450 starts and the CPU 110 (and/or persistent memory caching driver 120) starts executing a read request (block 455). In an example embodiment, the read request requests a block of the storage device 155 to be read. In an example embodiment, the read request specifies an original sector number of the storage device 155. In an example embodiment, the CPU 110 (and/or persistent memory caching driver 120) then determines whether the block of the storage device 155 has been remapped to a memory block 245C in the persistent memory (block 460). For example, CPU 110 (and/or persistent memory caching driver 120) determines whether the block of the storage device 155 has been remapped to the memory block 245C in the persistent memory 140 by determining whether an OSN record 230C corresponding to the memory block 245C includes a record with an original sector number that matches the original sector number included in the read request. In an example embodiment, if the value in the OSN record 230C matches the original sector number included in the read request, then the CPU 110 (and/or persistent memory caching driver 120) determines that the block of the storage device 155 specified in the read request is remapped in the persistent memory 140. In an example embodiment, if the value in the OSN record 230C does not match the original sector number included in the read request, then the CPU 110 (and/or persistent memory caching driver 120) determines that the block of the storage device 155 specified in the read request is not remapped in the persistent memory 140.

In an example embodiment, if the CPU 110 (and/or persistent memory caching driver 120) determines that the block of the storage device 155 specified in the read request is remapped in the persistent memory 140, the memory block 245C is read from the persistent memory 140 (block 465). The execution of the read request is then completed (block 475). In an example embodiment, if the CPU 110 (and/or persistent memory caching driver 120) determines that the block of the storage device 155 specified in the read request is not remapped in the persistent memory 140, the block is read directly from the storage device 155 (block 470). In an example embodiment, the block from the storage device 155 that is read directly is a block that corresponds to an original sector number specified in the read request. In an example embodiment, if the CPU 110 (and/or persistent memory caching driver 120) determines that the block of the storage device 155 specified in the read request is not remapped in the persistent memory 140, the read request is sent to the storage device driver 125. The storage device driver 125 may then cause the block of the storage device 155 to be read or may forward the read request to the storage device 155. The execution of the read request is then completed (block 475). In an example embodiment, completing execution of the read request includes returning the requested data to the source of the request (e.g., the filesystem driver 130 or the database 175).

Figure 5:
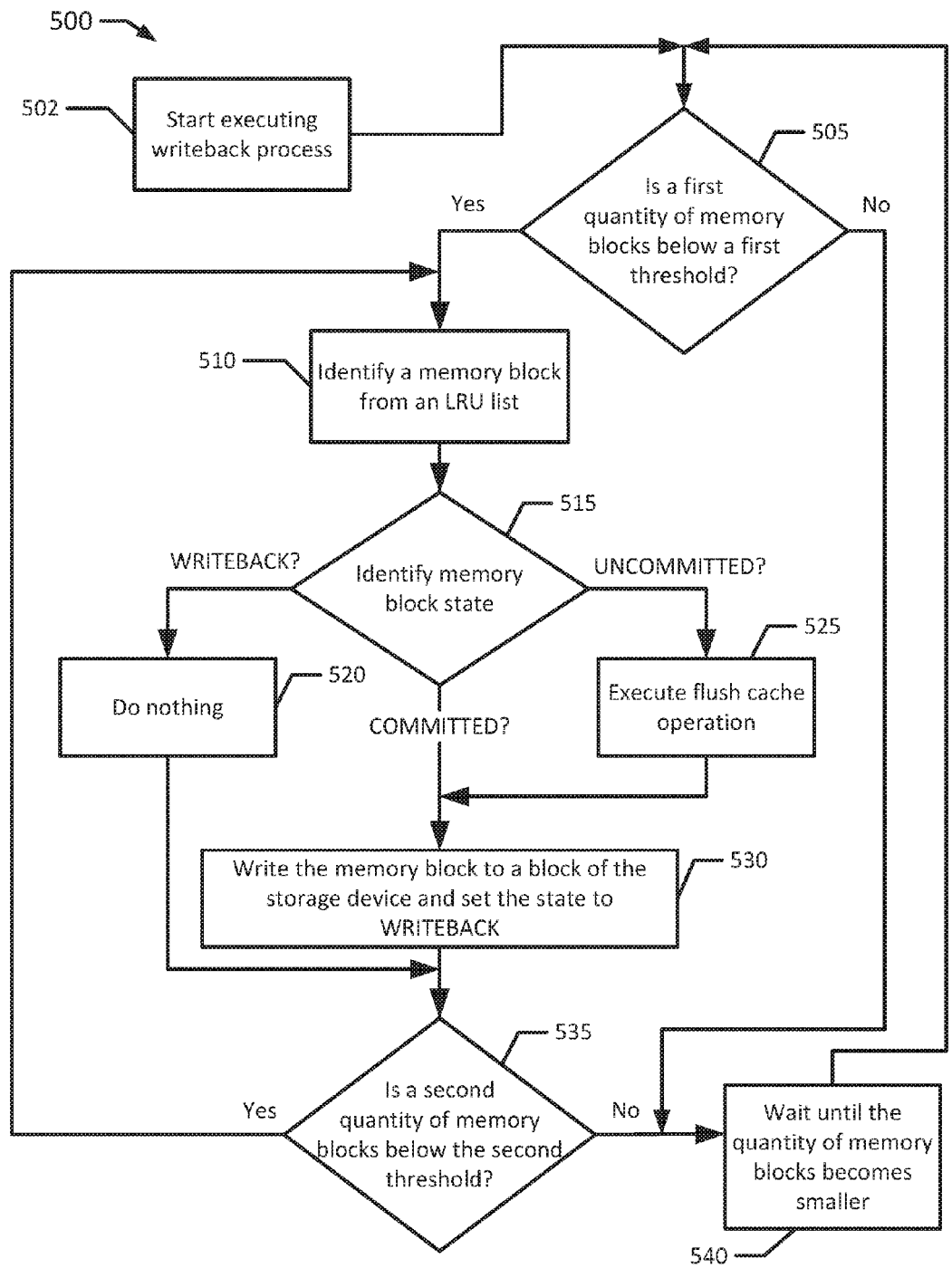
FIG. 5 is a flowchart illustrating an example writeback process according to an example embodiment of the present disclosure.

FIG. 5 illustrates a flowchart of an example method 500 for performing a writeback operation according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example embodiment, the method is performed by CPU 110 and/or persistent memory caching driver 120.

Example method 500 starts and the CPU 110 (and/or persistent memory caching driver 120) starts executing a writeback process (block 502). The CPU 110 (and/or persistent memory caching driver 120) determines whether a first quantity of memory blocks 245A-C is below a first threshold (block 505). In an example embodiment, the first quantity of memory blocks 245A-C is equal to the sum of the number of memory blocks 245A-C in a FREE state plus the number of memory blocks 245A-C in a WRITEBACK state at a first time. In an example embodiment, the first quantity of memory blocks 245A-C is equal to the number of memory blocks 245A-C in a FREE state. In an example embodiment, the CPU 110 (and/or persistent memory caching driver 120) may determine the number of memory blocks 245A-C in a FREE state and/or the number of memory blocks 245A-C in a WRITEBACK state using the data structure 137. In an example embodiment, the first threshold is a lower bound writeback threshold (e.g., a low watermark). In an example embodiment, if the a first quantity of memory blocks 245A-C is not below the first threshold, the CPU 110 (and/or persistent memory caching driver 120) may wait until the first quantity of memory blocks 245A-C becomes smaller (block 540). For example, the CPU 110 (and/or persistent memory caching driver 120) may wait until there are fewer blocks in a FREE state and/or fewer blocks in a WRITEBACK state. In an example embodiment, the CPU 110 (and/or persistent memory caching driver 120) may wait a predetermined period of time. In an example embodiment, the CPU 110 (and/or persistent memory caching driver 120) may then determine again whether a first quantity of memory blocks 245A-C is below a first threshold (block 505).

In an example embodiment, if the a first quantity of memory blocks 245A-C is below the first threshold, the CPU 110 (and/or persistent memory caching driver 120) may identify a memory block 245C from a least recently used list on the data structure 137 (block 510). In an example embodiment, the CPU 110 may identify the memory block 245C that is the least recently written block. In an example embodiment, responsive to identifying the memory block 245C, the CPU 110 (and/or persistent memory caching driver 120), determines the state of the memory block 245C (block 515). If the identified memory block 245C is in a WRITEBACK state, the CPU 110 (and/or persistent memory caching driver 120) is not required to do anything (block 520). If the memory block 245C is in a COMMITTED state, the CPU 110 (and/or persistent memory caching driver 120) performs a writeback operation including writing the data of the identified memory block 245C from the persistent memory 140 to the storage device 155 and setting the state of the memory block 245C to WRITEBACK (block 530). In an example embodiment, writing the data of the identified memory block 245C from the persistent memory 140 to the storage device 155, includes writing this data to a block of the storage device 155 corresponding to the original sector number stored in the OSN record 230C corresponding to the memory block 245C of the persistent memory 140. As described above, once a writeback operation is complete, state of the memory block 245C may be changed from WRITEBACK to FREE.

In an example embodiment, if the memory block 245C is in an UNCOMMITTED state, the CPU 110 (and/or persistent memory caching driver 120) executes a flush cache operation as described above with reference to FIG. 4 (block 525). The CPU 110 (and/or persistent memory caching driver 120) then performs a writeback operation including writing the data of the identified memory block 245C from the persistent memory 140 to the storage device 155 and setting the state of the memory block 245C to WRITEBACK (block 530).

In an example embodiment, as illustrated in FIG. 5, the CPU 110 (and/or persistent memory caching driver 120) then determines whether a second quantity of memory blocks 245A-C is below a second threshold (block 535). In an example embodiment, the second quantity of memory blocks 245A-C is equal to the sum of the number of memory blocks 245A-C in a FREE state plus the number of memory blocks 245A-C in a WRITEBACK state at a second time. In an example embodiment, the second quantity of memory blocks 245A-C is equal to the number of memory blocks 245A-C in a FREE state.

In an example embodiment, the second threshold is a higher bound writeback threshold (e.g., a high watermark). For example, the second threshold may be higher than the first threshold. In an example embodiment if the second quantity of memory blocks 245A-C is below the second threshold, the CPU 110 (and/or persistent memory caching driver 120) may identify another memory block 245B from a least recently used list on the data structure 137 as described above (block 510). In an example embodiment, if the second quantity of memory blocks 245A-C is not below the second threshold, the CPU 110 (and/or persistent memory caching driver 120) may wait until the second quantity of memory blocks 245A-C becomes smaller as described above (block 540).

In this manner, the CPU 110 (and/or persistent memory caching driver 120) of the present disclosure advantageously copies memory blocks 245A-C from the persistent memory 140 to the storage device 155 to make these memory blocks 245A-C FREE. In an example embodiment, the writeback operation is executed when the CPU 110 (and/or persistent memory caching driver 120) is not otherwise busy so that higher priority tasks such as memory access operations (e.g., write requests) are not slowed.

Figure 6:
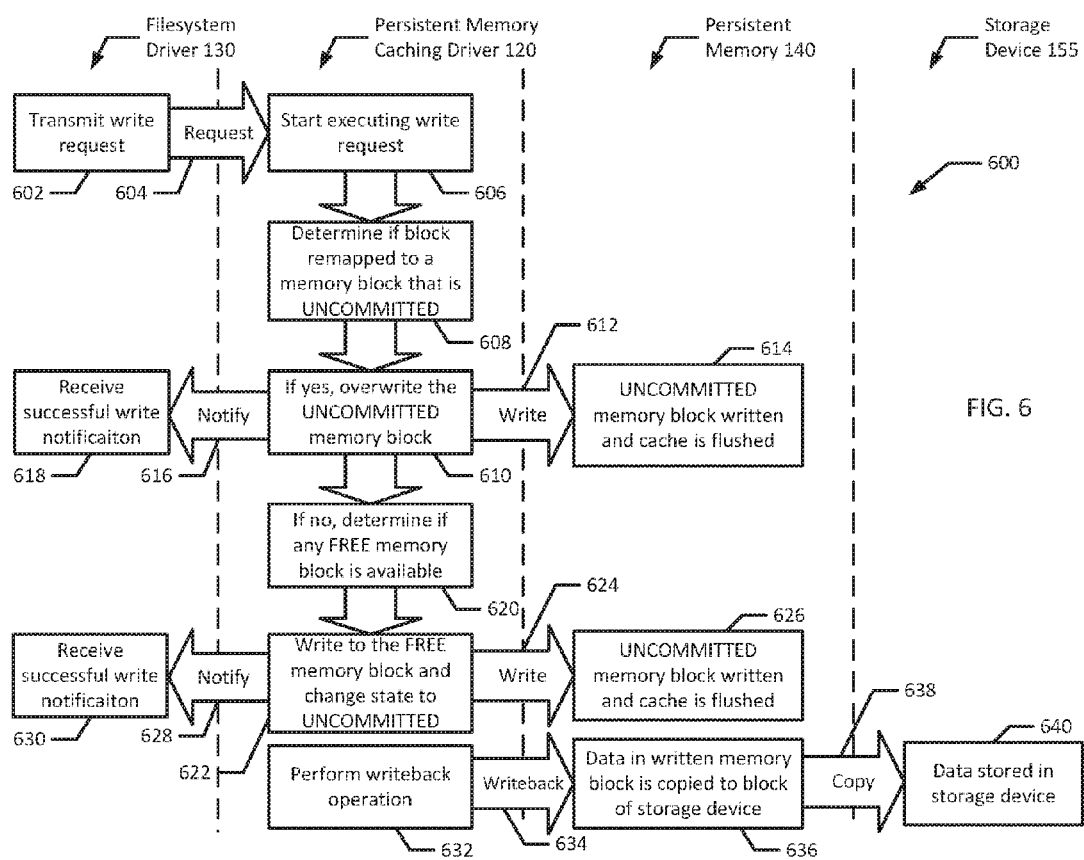
FIG. 6 is a flow diagram illustrating an example process for using persistent memory to accelerate write performance according to an example embodiment of the present disclosure.

FIG. 6 illustrates a flow diagram of an example method 600 for using persistent memory to accelerate write performance in accordance with an example embodiment of the present disclosure. Although the example method 600 is described with reference to the flow diagram illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

Example method 600 starts and a filesystem driver 130 transmits a write request to the persistent memory caching driver 120 (blocks 602 and 604). The persistent memory caching driver 120 may then start executing the received write request (block 606). The persistent memory caching driver 120 then determines if the block of the storage device 155 specified in the write request has been remapped to a memory block 245A in the persistent memory 140 and is in an UNCOMMITTED state (block 608). If both these conditions are true, the persistent memory caching driver 120 overwrites the UNCOMMITTED memory block 245A with data that is specified in the write request (blocks 610 and 612). The UNCOMMITTED memory block 245A is written in the persistent memory 140 and the CPU cache 135 may subsequently be flushed (block 614). In an example embodiment, flushing the CPU cache 135 includes changing the state of the UNCOMMITTED memory block 245A to COMMITTED. The persistent memory caching driver 120 may then notify the filesystem driver 130 that the write request has been successfully completed (block 616). The filesystem driver 130 receives this successful write notification (block 618).

If either the block of the storage device 155 specified in the write request has not been remapped in the persistent memory 140 or the memory block 245A is not in an UNCOMMITTED state, the persistent memory caching driver 120 determines if any FREE memory block 245B is available in the persistent memory 140 (block 620). If such a FREE memory block 245B is available, the persistent memory caching driver 120 writes to the FREE memory block 245B (blocks 622 and 624). In an example embodiment, the persistent memory caching driver 120 further changes the state of the FREE memory block 245B to UNCOMMITTED. The UNCOMMITTED memory block 245B is now written in the persistent memory 140 and the CPU cache 135 may subsequently be flushed (block 626). In an example embodiment, flushing the CPU cache 135 includes changing the state of the UNCOMMITTED memory block 245B to COMMITTED. The persistent memory caching driver 120 may then notify the filesystem driver 130 that the write request has been successfully completed (block 628). The filesystem driver 130 receives this successful write notification (block 630).

The persistent memory caching driver 120 may then perform a writeback operation of the COMMITTED memory block (either 245A or 245B) (blocks 632 and 634). The data in the COMMITTED memory block (either 245A or 245B) of the persistent memory is then copied to the storage device 155 (blocks 636 and 638). This data is now stored in the storage device 155 (block 640).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for accelerating memory write performance, comprising:
   a central processing unit (CPU);
   a CPU cache included in the CPU; and
   a persistent memory including a mapping area;
   wherein the CPU is configured to:
   execute a write request that includes an original sector number (OSN), wherein the write request requests first data to be written to a first block of a storage device outside the CPU and the persistent memory, wherein executing the write request includes determining (i) whether the first block is remapped to a first memory block in the persistent memory by determining whether the OSN matches an OSN record in the mapping area and (ii) whether the first memory block is in an uncommitted state by determining whether a mapping area sequence number corresponding to the OSN record is equal to a superblock sequence number, where the first memory block stores data unprotected from power failure; and
   responsive to determining that the first block is remapped to the first memory block in the persistent memory and that the first memory block is in the uncommitted state, overwrite the first memory block in the persistent memory with the first data.

2. The system of claim 1, wherein the CPU is further configured to:
   responsive to determining at least one of (a) the first block is not remapped to the first memory block in the persistent memory and (b) the first memory block is not in the uncommitted state, determine whether the persistent memory includes a second memory block that is in a free state; and
responsive to determining that the persistent memory includes the second memory block that is in the free state, map the second memory block to a second block of the storage device, write the first data to the second memory block, and place the second memory block in the uncommitted state.

3. The system of claim 2, wherein mapping the second memory block further includes setting an original sector number record of the second memory block to a block number of the second block.

4. The system of claim 2, wherein the CPU is further configured to:
responsive to determining that the persistent memory does not include a second memory block that is in the free state, waiting until a free memory block becomes available.

5. The system of claim 1, wherein the CPU is further configured to:
execute a read request, wherein the read request requests a second block of the storage device to be read, and wherein executing a read request includes determining whether the second block is remapped to a second memory block in the persistent memory; and
responsive to determining that the second block is remapped to a second memory block in the persistent memory, read second data from the second memory block of the persistent memory.

6. The system of claim 5, wherein the CPU is further configured to:
responsive to determining that the second block is not remapped to a second memory block in the persistent memory, read the second block from the storage device.

7. The system of claim 1, wherein the CPU is further configured to:
execute a flush cache request wherein the flush cache request requests that the CPU cache be flushed for all uncommitted memory blocks, and wherein executing a flush cache request includes flushing cached data in a CPU memory controller to the persistent memory and changing the state of all memory blocks in the uncommitted state to a committed state.

8. The system of claim 1, wherein the CPU is further configured to:
determine whether a first quantity of memory blocks in the persistent memory is below a first threshold;
responsive to determining that the first quantity of memory blocks is below the first threshold, identify a second memory block, wherein the second memory block is the least recently written block;
responsive to identifying the second memory block, determine the state of the second memory block; and
responsive to determining that the second memory block is a committed state, perform a writeback operation and set the state of the second memory block to writeback, wherein the writeback operation includes writing second data of the second memory block from the persistent memory to a storage device.

9. A method for accelerating memory write performance, comprising:
executing, by a central processing unit (CPU) including a CPU cache, a write request that includes an original sector number (OSN), wherein the write request requests first data to be written to a first block of a storage device outside the CPU and a persistent memory, wherein executing the write request includes determining (i) whether the first block is remapped to a first memory block in the persistent memory by determining whether the OSN matches an OSN record in a mapping area in the persistent memory and (ii) whether the first memory block is in an uncommitted state by determining whether a mapping area sequence number corresponding to the OSN record is equal to a superblock sequence number, where the first memory block stores data unprotected from power failure; and
responsive to determining that the first block is remapped to the first memory block in the persistent memory and that the first memory block is in the uncommitted state, overwriting, by the CPU, the first memory block in the persistent memory with the first data.

10. The method of claim 9, further comprising:
responsive to determining at least one of (a) the first block is not remapped to the first memory block in the persistent memory and (b) the first memory block is not in the uncommitted state, determining whether the persistent memory includes a second memory block that is in a free state; and
responsive to determining that the persistent memory includes the second memory block that is in the free state, mapping the second memory block to a second block of the storage device, writing the first data to the second memory block, and placing the second memory block in the uncommitted state.

11. The method of claim 10, wherein mapping the second memory block further includes setting an original sector number record of the second memory block to a block number of the second block.

12. The method of claim 10, further comprising:
responsive to determining that the persistent memory does not include a second memory block that is in the free state, waiting until a free memory block becomes available.

13. The method of claim 9, further comprising:
execute a read request, wherein the read request requests a second block of the storage device to be read, and wherein executing a read request includes determining whether the second block is remapped to a second memory block in the persistent memory; and
responsive to determining that the second block is remapped to a second memory block in the persistent memory, reading second data from a second memory block of the persistent memory.

14. The method of claim 13, further comprising:
responsive to determining that the second memory block is not remapped to a second memory block in the persistent memory, reading the second block from a storage device.

15. The method of claim 9, further comprising:
executing a flush cache request wherein the flush cache request requests that the CPU cache be flushed for all uncommitted memory blocks, and wherein executing a flush cache request includes flushing cached data in a CPU memory controller to the persistent memory and changing the state of all memory blocks in the uncommitted state to a committed state.

16. The method of claim 9, further comprising:
determining whether a first quantity of memory blocks in the persistent memory is below a first threshold;
responsive to determining that the first quantity of memory blocks is below the first threshold, identifying a second memory block, wherein the second memory block is the least recently written block;

responsive to identifying the second memory block, determining the state of the second memory block; and responsive to determining that the second memory block is a committed state, performing a writeback operation and setting the state of the second memory block to writeback, wherein the writeback operation includes writing second data of the second memory block from the persistent memory to a storage device.

17. A computer-readable non-transitory storage medium comprising executable instructions that, when executed by a computer system, cause the computer system to:

execute, by a central processing unit (CPU) including a CPU cache, a write request that includes an original sector number (OSN), wherein the write request requests first data to be written to a first block of a storage device outside the CPU and a persistent memory, wherein executing the write request includes determining (i) whether the first block is remapped to a first memory block in the persistent memory by determining whether the OSN matches an OSN record in a mapping area in the persistent memory and (ii) whether the first memory block is in an uncommitted state by determining whether a mapping area sequence number corresponding to the OSN record is equal to a superblock sequence number, where the first memory block stores data unprotected from power failure; and responsive to determining that the first block is remapped to the first memory block in the persistent memory and that the first memory block is in the uncommitted state, overwrite, by the CPU, the first memory block in the persistent memory with the first data.

18. The computer-readable non-transitory storage medium of claim 17, wherein responsive to determining at least one of (a) the first block is not remapped to the first memory block in the persistent memory and (b) the first memory block is not in the uncommitted state, determine whether the persistent memory includes a second memory block that is in a free state; and responsive to determining that the persistent memory includes the second memory block that is in the free state, map the second memory block to a second block of the storage device, write the first data to the second memory block, and place the second memory block in the uncommitted state.

19. The computer-readable non-transitory storage medium of claim 18, wherein mapping the second memory block further includes setting an original sector number record of the second memory block to a block number of the second block.

20. The computer-readable non-transitory storage medium of claim 18, wherein responsive to determining that the persistent memory does not include a second memory block that is in the free state, waiting until a free memory block becomes available.

* * * * *